Feb. 11, 1930.  D. C. KLAUSMEYER  1,746,264
CONVERTIBLE DRILLING AND TAPPING MACHINE
Original Filed Feb. 10, 1925   2 Sheets-Sheet 2
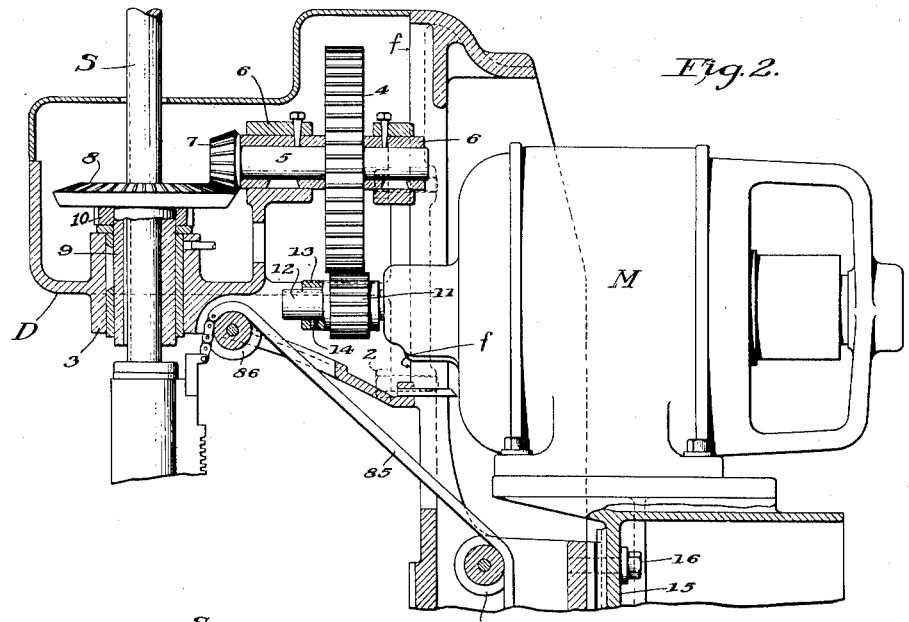
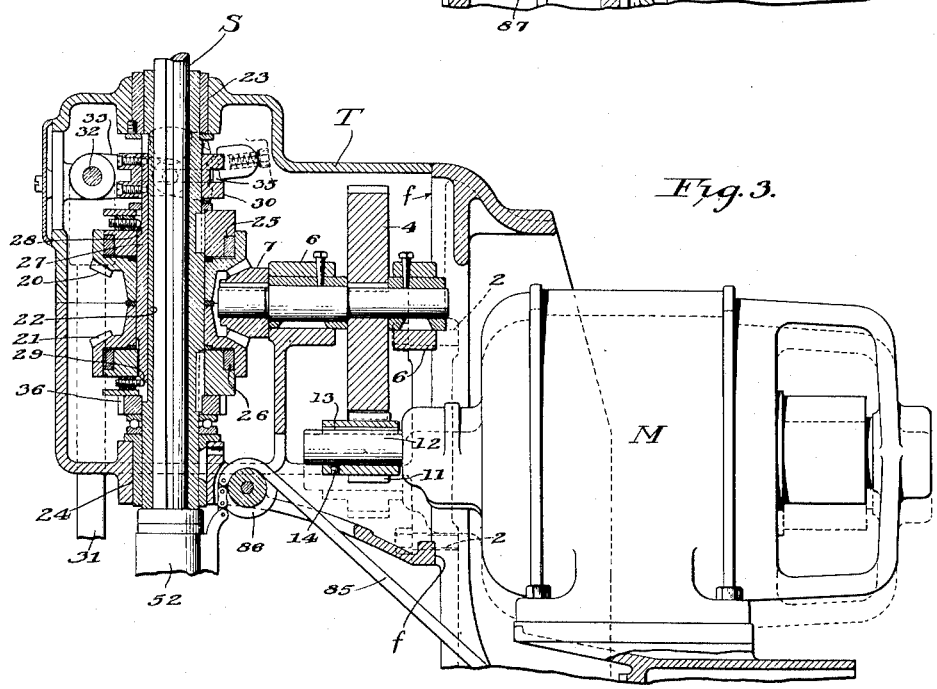
Inventor
David C. Klausmeyer
By Attorney
Albert F. Nathan Patented Feb. 11, 1930

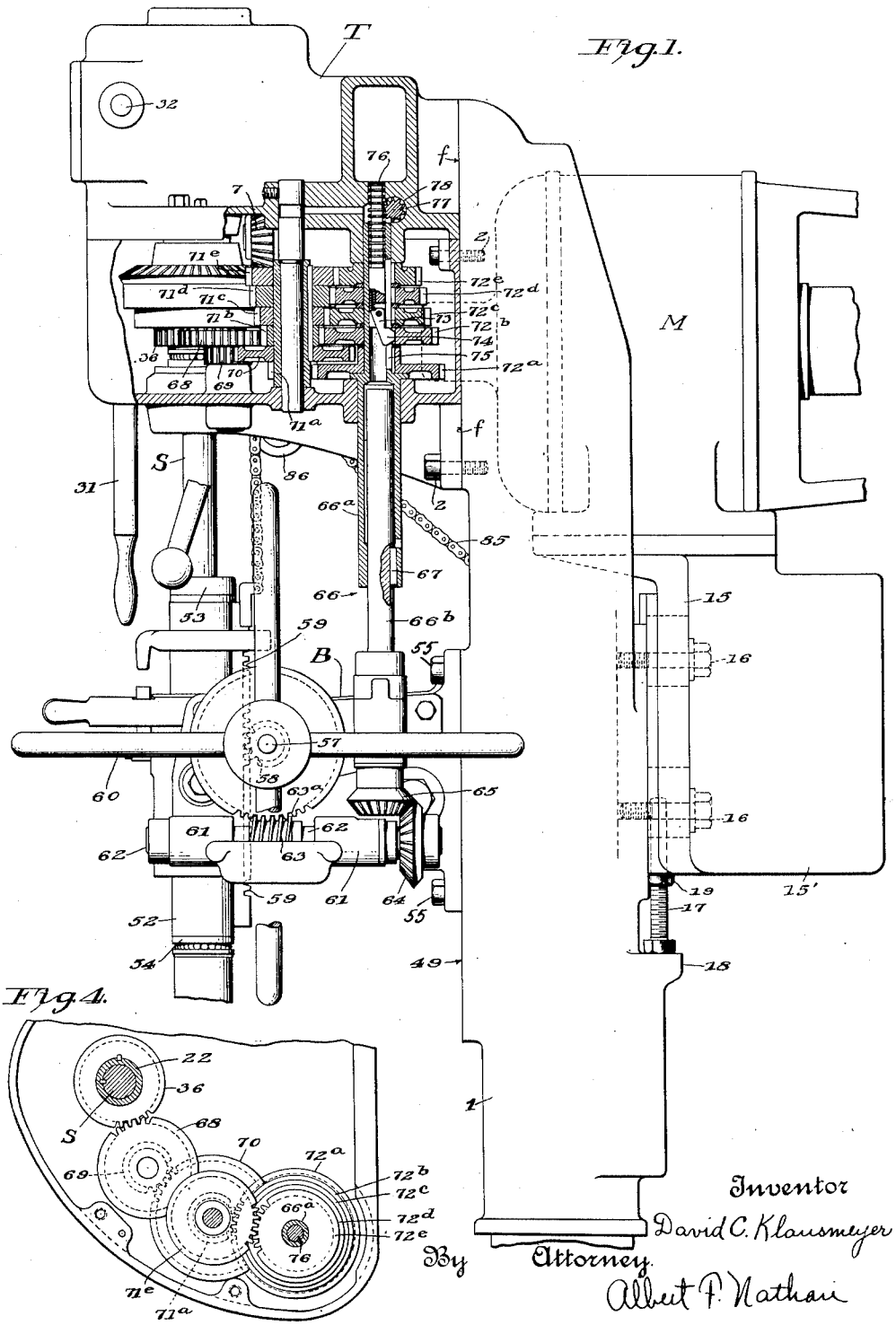

1,746,264

UNITED STATES PATENT OFFICE

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO

CONVERTIBLE DRILLING AND TAPPING MACHINE

Original application filed February 10, 1925, Serial No. 8,185. Divided and this application filed June 12, 1926. Serial No. 115,425.

Under present-day methods of manufacture, and especially in factories where great numbers of duplicate parts are produced, it has been found advantageous to utilize machine tools particularly constructed to effect only a few very similar operations and in some instances, only a single operation; as distinguished from machine tools which, by complicated adjustments, speed change mechanism, etc., may be utilized to perform a great number and large variety of operations. It will readily be perceived that a single-purpose machine tool may be much simpler in construction and therefore less costly to install and operate than a universal machine. Therefore, where production warrants the installation of a greater number of machines, single-purpose machines are preferable.

While single-purpose machine tools are generally conceded to be most efficient for quantity production there are, however, certain times and conditions that make it desirable to have these machines adaptable to changes or alterations which fit them for new and different operations. This invention therefore proposes an upright drill which, by the bodily removal of a certain bracket, or casing, carrying a spindle and a suitable train of spindle-driving gears, and the subsequent attachment of a similar part having a different spindle drive, the machine tool may be utilized for an operation for which previously it was not adapted.

This interchangeability of the spindle supporting and driving bracket not only permits the user, at a nominal cost, to equip a single purpose drill so as to adapt it to perform additional operations but it also permits the manufacturer to construct, in large numbers, the entire drills with the exception of the spindle suporting and driving bracket and subsequently to attach a suitable bracket to give any spindle drive as required by the varying demands of the trade.

As used throughout this specification, the term "single purpose" is not to be construed literally but rather as designating the adaptability of a machine tool to perform only such operations as may be performed without great variations in speed and in a predetermined direction of rotation of the tool spindle.

This invention therefore has for an object to provide a convertible drilling and tapping machine which, while embodying all of the advantages of a single-purpose tool, readily may be so converted as to adapt it particularly for either drilling or tapping operations.

Stated more specifically, this invention has for an object to provide an upright machine tool adapted to have removably secured to it any one of a plurality of interchangeable brackets or heads each of which is equipped with mechanism adapted to perform one specific operation such for example as drilling or tapping.

Another object of this invention is to render available an interchangeable head drilling or tapping machine and to provide a built-in-motor drive therefore adapted to be connected directly with spindle rotating mechanism carried by the individual heads.

A further object of the invention is to provide means whereby a driving gear, carried by the motor shaft, readily may be replaced by a gear of another size to change the ratio between the two gears thereby to vary the speed of rotation of the spindle from a constant speed in the motor.

Still another object is to provide an adjustable mounting for the built-in motor whereby it may be shifted relatively to the mechanism which it is adapted to drive to compensate for variations in the mechanisms of the various interchangeable heads and also to provide for changes in the ratio between a driving element carried by the motor shaft and a driven element carried by the interchangeable heads thereby varying the ratio between the motor and the spindle.

The objects of this invention have been attained in an upright drilling and tapping machine including a standard designed to have removably attached to it, at its upper end, any one of a plurality of interchangeable spindle-supporting and driving brackets. These brackets are preferably, but not necessarily, in the nature of casings and each is fitted with a driving connection, preferably comprising a train of gears of which one is adapted to be meshed with a driving gear carried by a suitable motor or other prime-mover adjustably carried by the standard, also adjacent its upper end. These driving connections afford means to rotate the spindle at materially different speeds and in reverse directions. For example, one bracket may be so fitted as to produce a direct unidirectional drive from the motor to the spindle such as may be used to advantage for drilling; and another may be fitted with reversing mechanism by means of which spindle may be caused to rotate in reverse directions. This latter construction is desirable when the machine tool is to be used for tapping, inasmuch as the reverse direction of the spindle may be utilized to unscrew the tap from its tapped hole. The driving gear which drives the spindle rotating train carried by each of the interchangeable brackets is removably secured upon the motor shaft and the motor is adjustably mounted on the standard. By means of this arrangement various sizes of driving gears may be secured upon the motor shaft thereby varying the ratio between the driving gear and the initial gear of the spindle driving train.

Both power and manual means are provided for translating the tool-spindle. A portion of the power feed is preferably carried by a feed bracket removably secured upon a feed head attached to the standard. This feed bracket and the power feed mechanism may be eliminated whenever it is desired to have a machine fitted for hand feed only.

This application is a division of my application Serial No. 8,185, filed February 10, 1925, "Direct drive drill."

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a side elevation, partly in section, of a portion of a convertible drilling and tapping machine embodying the present invention. Fig. 2 is a sectional view of the upper portion of the machine shown in Fig. 1 with a removable drilling head attached to the standard. Fig. 3 is a view similar to Fig. 2 but showing the standard equipped with a tapping head. Fig. 4 is a detail section on the line 4—4 of Fig. 1 showing, in plan, the spindle-feed drive gears carried by the spindle supporting bracket and actuated from the spindle drive sleeve.

Referring more specifically to the drawings, the invention is disclosed in its preferred form as embodied in a machine tool comprising an upright standard 1 adapted to support, at its upper end, any one of a plurality of interchangeable brackets each fitted with a different type of spindle rotating mechanism. This standard also supports, at its upper end, a prime-mover preferably, but not necessarily, in the form of an electric-motor M which provides power to rotate and translate the spindle journaled in each of the several brackets. This motor may be either of the single or variable speed type as may be demanded by the trade. Intermediate its ends the standard also has secured to it a spindle feed bracket B and a suitable work-table, not shown. For a more complete illustration of this machine tool reference may be had to my pending application Serial No. 8,185, above referred to, of which this application is a division.

As hereinbefore explained this invention proposes a machine-tool which readily may be converted from a drilling machine, in which the tool spindle may be rotated only in a single direction, to a tapping machine in which the spindle may be rotated first in one direction to screw the tap into the work and then reversed to unscrew it therefrom and also to be fed axially to force the tap into the work substantially in accordance with the lead of the thread on the tap. To this end the upper end of the standard is provided with a finished face $f$ against which may be secured, as by screws 2, either a drilling bracket D, as shown in Fig. 2 or a tapping bracket T as shown in Figs. 1 and 3. It is to be understood that each of the brackets is formed with a finished face and screw holes which are complemental to the finished face and screw holes provided by the standard.

Within the drilling bracket D is arranged a single speed uni-directional drive for the tool spindle S which is splined in a sleeve 9 rotatably journaled in a bearing 3 provided by said bracket. This drive preferably comprises a first-driven gear 4 secured upon a stub shaft 5 journaled in bearings 6 also provided by the bracket. A bevel pinion 7 fixed to the shaft 5 drives a gear 8 secured to the sleeve 9 and serves to transmit rotary motion to said sleeve and spindle. A gear 10 rotatable with the gear 8 may serve to actuate spindle feeding mechanism later to be described. The gear 4 meshes with, and is driven by a driving pinion 11 removably secured upon the armature shaft 12 of the motor M as by a key 13 and set-screw 14. This removability of the driving pinion 11 permits gears of various sizes to be secured upon the motor shaft, whereby the ratio between the driving gear and the initial driven gear 4 may be changed to vary the speed of rotation of the spindle S. To effect the proper meshing of driving and driven gears of various ratios the motor is preferably so supported upon the standard as to be adjustable toward and from the axis of the shaft 5. This may be effected by securing the motor upon a bracket 15 adjustably mounted for vertical movement upon the upper portion of the standard 1 and adapted to be secured in its adjusted position by screws 16 passing through apertures in the bracket and threaded into the standard. A screw 17, threaded into the lower part of the bracket 15 and having its head resting upon a shoulder 18 provided by the standard, serves to adjust the bracket vertically on the standard. A jam-nut 19 threaded upon the screw 17 assists in maintaining the bracket in its adjusted positions. The bracket 15 also carries a controller box 15′ adapted to house any suitable type of motor controller.

It will be readily perceived that inasmuch as the spindle driving train is completely assembled in the bracket D and the gears 4 and 11 readily may be separated, removal of the screws 2 will permit the bracket and the mechanism carried thereby to be removed from the standard as a unit, whereupon another bracket, equipped with a reversible drive, may be attached in its place. The spindle S has a splined connection with the spindle rotating sleeve 9 and therefore if desired the bracket and sleeve may be stripped from the spindle leaving the spindle supported by the feed bracket B. The next bracket to be attached to the standard may then be passed down over the spindle thereby inserting the spindle into the spindle driving sleeve after which it may be secured to the standard by the screws 2. The tapping bracket shown in Figs. 1 and 3 also embodies a driven shaft 5 journaled in bearings 6 and which carries, at one end, a driven gear 4 adapted to be meshed with a gear on the motor shaft and, at the other end, a bevel pinion 7. At opposite sides of its center the pinion 7 meshes with and continuously drives, in opposite directions, bevel-gears 20 and 21 freely rotatable on a long sleeve 22 journaled in bearings 23 and 24 provided by the tapping bracket T. Like the sleeve 9, the sleeve 22 has a splined connection with the tool spindle and rotation of the sleeve likewise causes rotation of the spindle. Either of the oppositely rotating gears 20 or 21 selectively may be caused to rotate the sleeve 22. This selective drive is effected by friction clutches 25 and 26 carried by the sleeve 22 and cooperating with the gears 20 and 21 respectively. These clutches are selectively rendered effective to drive the spindle by endwise movement of a bar 27 having clutch-actuating cam-surfaces 28 and 29. A collar 30, slidably mounted upon the sleeve 22 is attached to the bar 27 and therefore translation of the collar shifts the bar and actuates the clutches 25 and 26. Manual means is provided for shifting the collar 30. This comprises a lever 31 fixed upon a shaft 32 journaled horizontally in the bracket T. The shaft has secured to it, inside the casing, an arm 33 which carries a shoe or stud 34 fitted within an annular groove 35 in the collar 30. Thus by suitable manipulation of the lever 31 the drill spindle may be caused to rotate either forwardly or backwardly as desired. The spindle rotating sleeve 22 also carries a spindle feed drive gear 36 later to be referred to. The specific construction of this reversing mechanism forms the subject of my pending application Serial No. 805 filed January 6, 1925.

The standard 1 is formed, intermediate its ends with a finished face 49 similar to the face $f$. Upon the face 49 is adapted to be secured by bolts 55 a spindle feed head B within which is translatably mounted a spindle feed sleeve 52. The spindle S is rotatably journaled in the sleeve 52 and thrust bearings 53 and 54 carried by the spindle at opposite ends of the sleeve 52 prevent relative endwise movement between the two. Within the head B is journaled a shaft 57 which carries a pinion 58 meshing with a rack 59 affixed to the sleeve 52. A pilot lever 60, attached to the shaft 57, affords means whereby the sleeve 52 and thereby the spindle S may be translated manually. When so desired, power means may be provided to translate the tool spindle. To provide for the attachment of this power feed the head B is preferably formed with the necessary finished surfaces and bolt holes to which may be secured a power feed bracket 61 carrying a horizontal shaft 62 upon which is secured a worm 63 and a bevel-gear 64. The worm is adapted to drive a worm wheel $63^a$ which (when a power feed is desired) is secured to the shaft 57. The bevel-gear 64 is driven by a similar gear 65 carried by one portion of a vertically disposed telescopic feed shaft 66. This shaft comprises sections $66^a$ and $66^b$ splined together as at 67 thereby permitting the spindle feed actuating mechanism, carried by the interchangeable brackets D and T to be disconnected from and reconnected with the feed mechanism carried by the feed head B. Power to rotate the shaft 66 is taken from either of the gears 10 or 36, hereinbefore referred to, and transmitted through gears 68, 69 and 70 to a cone of gears 71. This cone comprises gears $71^a$, $71^b$, $71^c$, $71^d$ and $71^e$ maintained permanently in mesh with gears $72^a$, $72^b$, $72^c$, $72^d$ and $72^e$ respectively. The last named gears are loosely journaled upon the shaft section $66^a$ and are adapted selectively to be secured thereto by means of a drive key 73 pivoted upon a rack-bar 76 slidable lengthwise in the section $66^a$. The key has a head 74 projecting through a slot 75 in the section $66^a$ and entering slots formed in the inner periphery of the gears. The rack-bar 76 is preferably cylindrical, having the rack-teeth running entirely around it, thereby permitting the rack-bar to rotate while in engagement with a pinion 77 held in a horizontal bore 78 in the spindle bracket. The pinion may be rotated in reverse directions, to shift the rack-bar 76 axially, by any suitable means carried by the spindle bracket. Inasmuch as this specific shifting means forms no part of this invention and as it is clearly disclosed in the pending application of which the application is a division, detailed illustration and description thereof is deemed unnecessary.

The spindle S may be counterbalanced by a suitable counter-weight attached to one end of a chain or other flexible connector 85 which passes over rollers 86 and 87 supported by the spindle bracket and the standard respectively, and has its other end attached to the spindle feeding sleeve.

From the foregoing it will be perceived that this invention provides a convertible upright drilling and tapping machine which is adapted to receive any one of a plurality of interchangeable and differently fitted spindle drive brackets; which embodies very direct and compact driving connections between the prime-mover and the spindle; which provides for the ready change of gear ratio; and when fitted with either a bracket having a uni-directional drive for drilling or with a bracket having a reversible drive for tapping possesses all of the advantages of a single purpose machine.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combination and elements, or equivalents thereof, by Letters Patent of the United States:—

1. A machine tool combining a standard; a prime-mover carried by said standard; a bracket removably secured upon said standard; a tool spindle rotatably and translatably journaled in said bracket; spindle feeding means supported by said standard independent of said bracket; a spindle rotating train assembled on said bracket and including a gear adapted to mesh with a gear on said prime-mover to rotate said spindle from said prime-mover; a motion-reverser embodied in said train; and actuating mechanism for said motion reverser also carried by said bracket, said bracket, spindle-rotating train, motion reverser, and reverser-actuating means being adapted to be removed bodily from said standard without disturbing their operative relations.

2. A tapping machine combining a standard; a prime-mover carried by said standard and including a driving shaft; a bracket removably secured upon said standard; a tool-spindle rotatably and translatably journaled in said bracket; a spindle-rotating train assembled on said bracket and including a driven shaft and an initial driven gear thereon; a spindle-feed actuating mechanism carried by said bracket and receiving motion from said spindle rotating train; a motion reverser embodied in said train and adapted to reverse the direction of rotation of said spindle; a driving gear secured upon said driving shaft and meshing with the initial driven gear of said spindle rotating train; means permitting said bracket to be removed from said standard without dis-assembling the spindle driving train; and means permitting the removal of one of said gears and its replacement by a gear of different size to vary the ratio between the driving and driven gears whereby the speed of rotation and rate of feed of said spindle may be varied.

3. A tapping machine as set forth in claim 2 characterized by this that the prime-mover consists of an electric motor and that the motor is adjustably mounted on the standard to permit the axis of its armature shaft to be adjusted toward and from the axis of the initial driven gear thereby to effect proper meshing of gears of varying sizes and ratio secured upon said armature-shaft and said driven shaft.

4. A convertible drilling and tapping machine combining a standard; a bracket removably secured upon said standard; a sleeve rotatably journeled in said bracket; a tool spindle splined in said sleeve; a prime-mover supported independently of said bracket; a shaft journaled in bearings provided by said bracket; a readily disconnectible gear connection between said shaft and said prime-mover; a driving bevel gear on said shaft; a pair of bevel gears loosely journaled on said sleeve and meshing with opposite sides of said first named bevel gear whereby they are reversely driven; a clutch device cooperating with each of said driven bevel gears; a clutch actuator carried by said removable bracket; an operative connection between said actuator and each of said clutches whereby they may be selectively engaged to rotate said sleeve in reverse directions, and means permitting the removal from said standard of said bracket, together with its spindle driving and reversing means and the substitution therefor of a bracket fitted with a uni-directional spindle drive.

5. A machine tool comprising an upright standard; a motor carried by said standard adjacent its upper end; a driving gear on the motor shaft; a spindle supporting bracket; a spindle driving element rotatably journaled in said bracket; a reversible driving connection and reverser for the same carried by said bracket including a driven gear adapted to mesh with said driving gear and an operative connection between said driven gear and said spindle driving element, said standard and bracket having complemental meeting faces and said bracket being removably secured to the standard whereby another bracket also having a face complemental to the face of the standard and substantially like the first mentioned bracket but provided with a unidirectional driving connection between the driven gear and the spindle driving element, may be attached to said standard.

6. An upright drilling and tapping machine combining a standard; a bracket removably secured to said standard; a spindle rotatably journaled in bearings supported by said bracket; a reversible spindle driving train embodied in said bracket and including an initial driven gear and a reversing clutch; a second bracket adjustably mounted on said standard; a prime mover secured to said second bracket; a driving pinion removably secured to and actuated by said prime mover and adapted to be meshed with said initial driven gear; said second bracket affording means for adjusting said prime mover and driving pinion toward and from said initial driven gear.

In witness whereof, I have hereunto subscribed my name.

DAVID C. KLAUSMEYER.